United States Patent
Golla et al.

(10) Patent No.: US 12,141,474 B2
(45) Date of Patent: Nov. 12, 2024

(54) QUEUE CIRCUIT FOR CONTROLLING ACCESS TO A MEMORY CIRCUIT

(71) Applicant: Cadence Design Systems, Inc., San Jose, CA (US)

(72) Inventors: Robert T. Golla, Austin, TX (US); Matthew B. Smittle, Allen, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 65 days.

(21) Appl. No.: 17/661,402

(22) Filed: Apr. 29, 2022

(65) Prior Publication Data

US 2023/0350605 A1 Nov. 2, 2023

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .................................................. G06F 3/0659
USPC ....................................................... 711/154
See application file for complete search history.

(56) References Cited

U.S. PATENT DOCUMENTS

| | | | | |
|---|---|---|---|---|
| 5,701,434 A | * | 12/1997 | Nakagawa | G06F 13/1642 711/138 |
| 5,737,547 A | * | 4/1998 | Zuravleff | G06F 9/3824 712/E9.046 |
| 5,887,146 A | * | 3/1999 | Baxter | G06F 11/22 714/E11.16 |
| 7,406,554 B1 | | 7/2008 | Huffman | |
| 7,533,248 B1 | | 5/2009 | Golla et al. | |
| 7,730,238 B1 | * | 6/2010 | Arulambalam | H04L 49/9047 710/52 |
| 8,301,865 B2 | | 10/2012 | Grohoski et al. | |
| 8,347,309 B2 | | 1/2013 | Smolens et al. | |
| 8,412,891 B2 | | 4/2013 | Demura et al. | |
| 2003/0126265 A1 | * | 7/2003 | Aziz | G06F 16/9574 709/227 |
| 2008/0140980 A1 | * | 6/2008 | Mei | G06F 12/0851 711/E12.047 |
| 2010/0100686 A1 | * | 4/2010 | Kiyota | G06F 12/0842 711/E12.001 |
| 2011/0238941 A1 | * | 9/2011 | Xu | G06F 13/1689 711/E12.001 |
| 2013/0152099 A1 | * | 6/2013 | Bass | G06F 9/5038 718/103 |
| 2014/0310437 A1 | | 10/2014 | Saund et al. | |
| 2015/0355948 A1 | * | 12/2015 | Bass | G06F 9/4843 718/104 |

(Continued)

*Primary Examiner* — Titus Wong
(74) *Attorney, Agent, or Firm* — Mark H. Whittenberger; Holland & Knight LLP (57) ABSTRACT

A queue circuit that manages access to a memory circuit in a computer system includes multiple sets of entries for storing access requests. The entries in one set of entries are assigned to corresponding sources that generate access requests to the memory circuit. The entries in the other set of entries are floating entries that can be used to store requests from any of the sources. Upon receiving a request from a particular source, the queue circuit checks the entry assigned to the particular source and, if the entry is unoccupied, the queue circuit stores the request in the entry. If, however, the entry assigned to the particular source is occupied, the queue circuit stores the request in one of the floating entries.

20 Claims, 8 Drawing Sheets

(56) References Cited

U.S. PATENT DOCUMENTS

| | | | |
|---|---|---|---|
| 2015/0355949 A1* | 12/2015 | Bass | G06F 9/5038 |
| | | | 718/103 |
| 2017/0052912 A1* | 2/2017 | Canepa | G06F 13/362 |
| 2017/0060745 A1* | 3/2017 | Wicki | G06F 12/0828 |
| 2023/0061419 A1* | 3/2023 | Beaumont-Smith | |
| | | | G06F 11/3037 |
| 2023/0342296 A1* | 10/2023 | Golla | G06F 12/0862 |

* cited by examiner

QUEUE CIRCUIT FOR CONTROLLING
ACCESS TO A MEMORY CIRCUIT

BACKGROUND

Technical Field

This disclosure relates to access to shared resources in a computer system, and, in particular, access to cache memory circuits.

Description of the Related Art

Computer systems include multiple processors or processor cores that may retrieve and execute program instructions from memory. The program instructions may be part of software programs or applications, and may be designed to perform particular functions, such as word processing, sending and receiving electronic mail, and the like. During execution of such a software program, instructions included in the software program may send data to, or receive data from, one or more devices included in, or coupled to, the computer system. Such data may also be stored and later retrieved from a memory circuit included in the computer system.

To facilitate the retrieval of program instructions, and the storage of data, computer systems may include multiple memory circuits. Such memory circuits may vary in storage capacity as well as access time. In some computer systems, memory circuits may be arranged in a hierarchical fashion, with smaller, faster memory circuits (referred to as "cache memories") coupled directly to processor circuits or processor cores. Larger, slower memory circuits (referred to as "main memory") are coupled to the processor circuits or processor cores via a memory management unit and a communication network.

Cache memories may store frequently used program instructions and data, so that a processor may quickly retrieve frequently used program instructions and data without having to wait for access to main memory. Accesses to main memory can take multiple processing cycles, which can cause a processor circuit or processor core to wait for requested data, resulting in a decrease in performance.

DETAILED DESCRIPTION

Computer systems often employ a hierarchy of memory circuits, with smaller-capacity, higher-performing memory circuits located in close proximity to processor circuits. During operation of a computer system, various memory circuits may store a variety of data relating to operands, instructions, graphics, or other audio and visual data.

One particular type of memory circuit employed in a computer system is a cache memory circuit, which is used to store frequently used program instructions and data for a processor circuit. By storing frequently used program instructions and data, a computer system can avoid delays associated with accesses to main memory or external storage devices, thereby improving performance. Stored information in a cache memory circuit is organized in "cache lines" that include multiple bits. In some cases, a cache line may store a single program instruction, an operand, or any other suitable type of data.

In many computer systems, some cache memory circuits can be shared by multiple processors or processor cores. In such cases, each of the processors or processor cores can generate access requests to the shared cache memory (or, more generally, any shared resource). Such access requests can include requests for a program instruction or data. The different processors or processor cores can be performing different tasks, which can cause them to generate different numbers of access requests at different times and with different frequencies.

Shared resources, e.g., cache memory circuits, can employ a queue circuit to temporarily store received access requests until they can be processed. The received access requests are typically received and processed in a first-in first-out manner. In some cases, however, one or more processors or processor cores can generate more requests in a period of time than other processors or processor cores connected to a given shared resource. When this occurs, the queue circuit can become full with pending access requests received from a few processors or processor cores, limiting access to the shared resource by the other processors or processor cores, which can reduce the overall performance of a computer system.

The embodiments illustrated in the drawings and described below provide techniques for managing access to a shared resource in a computer system. By partitioning a queue circuit into different sets of entries, the entries in one set can be assigned to corresponding request sources so that a given request source has at least one entry available in the queue circuit. The entries in the second set can be used to store requests from any source, such that sources that are generating a large number of access requests are not relegated to only have a single queue entry. By providing both a set of pre-assigned entries as well as a set of "floating" entries within a queue circuit, access requests to a shared resource can be managed to guarantee forward progress for sources generating a low volume of requests, as well as provide extra capacity for sources generating higher volumes of requests to maintain overall system performance.

Figure 1:
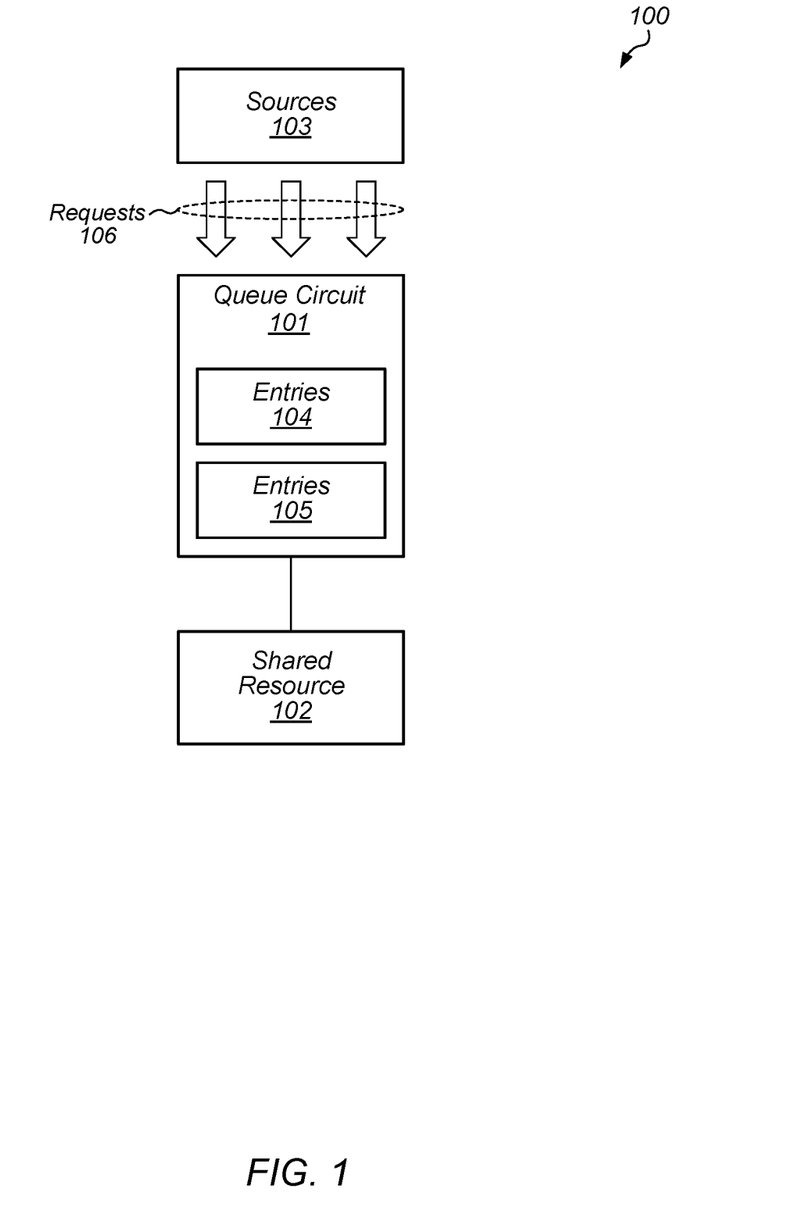
FIG. 1 is a block diagram of an embodiment of a portion of a computer system.

Turning now to FIG. 1, a block diagram of a portion of a computer system is depicted. As illustrated, computer system portion 100 includes queue circuit 101, shared resource 102, and sources 103.

Sources 103 are configured to generate requests 106. In various embodiments, requests 106 may be requests to access shared resource 102. As described below, sources 103 may include any suitable combination of hardware and software configured to generate requests for access to a shared resource. For example, in some cases, sources 103 may include multiple processor cores configured to generate corresponding ones of requests 106. Alternatively, sources 103 may include a single processor core configured to generate requests 106 by executing a corresponding plurality of threads. It is noted that although only three requests are depicted in the embodiment of FIG. 1, in other embodiments, any suitable number of requests may be sent, in parallel, to queue circuit 101.

Shared resource 102, which may include one or more memory circuits, cannot process requests 106 in parallel, so queue circuit 101 is used to manage access to shared resource 102 by storing requests 106 and then sending the stored requests to shared resource 102 in a serial fashion. In various embodiments, queue circuit 101 may be configured to function as a first-in first-out (FIFO) queue, where requests are relayed to shared resource 102 in the order in which the requests are received from sources 103.

In some cases, one or more sources of sources 103 can generate more requests in a given time period than other sources of sources 103. When this occurs, the requests from the one or more sources can fill all of the entries in queue circuit 101, preventing requests from the other sources from being queued for access to shared resource 102, limiting overall system performance.

To remediate this problem, queue circuit 101 includes entries 104 and entries 105 that are configured to store requests 106. As described below, entries included in entries 104 are assigned to corresponding ones of sources 103. For example, a particular entry included in entries 104 is configured to store requests only from a corresponding source included in sources 103. In contrast, entries included in entries 105 are configured to store requests from any of sources 103 and are referred to as "floating" entries. By providing a set of assigned entries, any source has at least one entry that cannot be used by other sources, increasing the likelihood of a given source making forward progress during periods when other sources are generating a large number of requests to access shared resource 102. The floating entries can be dynamically distributed to different sources to accommodate periods of higher numbers of access requests.

Queue circuit 101 is configured to store a given request of requests 106 in a particular entry of entries 105 in response to a determination that an entry in entries 104 that is assigned to a particular source of sources 103 that generated the given request is occupied. In various embodiments, queue circuit 101 is further configured to store a different request of requests 106 in a different entry of entries 104 assigned to a different source of sources 103 that generated the different request if the different entry is unoccupied.

Figure 2:
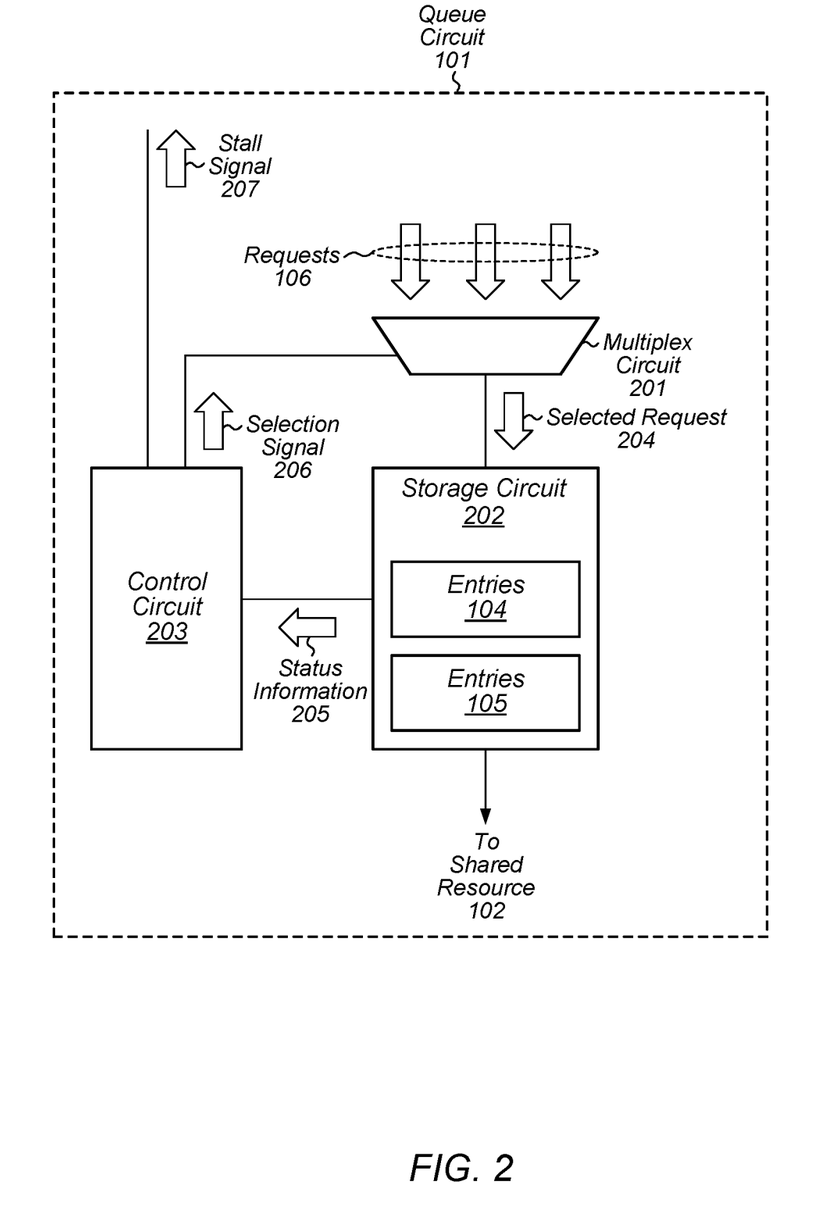
FIG. 2 is a block diagram of an embodiment of a queue circuit.

Turning to FIG. 2, a block diagram of an embodiment of queue circuit 101 is depicted. As illustrated, queue circuit 101 includes multiplex circuit 201, storage circuit 202, and control circuit 203.

Multiplex circuit 201 is configured to select, based on selection signal 206, a particular one of requests 106 to generate selected request 204. In various embodiments, multiplex circuit 201 may be implemented using any suitable collection of combinatorial logic gates. Alternatively, multiplex circuit 201 may be implemented using multiple pass-gate circuits coupled together in a wired-OR fashion.

Storage circuit 202 includes entries 104 and entries 105. In various embodiments, each entry included is configured to store a request generated by a corresponding one of sources 103. In various embodiments, a number of entries 104 may correspond to a number of sources included in sources 103.

Entries included in entries 105 are configured to store a request generated by any of sources 103. In various embodiments, a number of entries included in entries 105 may be based on a number of stalls a computer system can tolerate. For example, less entries in entries 105 may result in more stalls during operation of the computer system.

In various embodiments, entries 104 and entries 105 may include multiple storage cells. A number of storage cells included in a given one of entries 104 or entries 105 may be based on a number of bits included in a given request of requests 106. In some cases, additional storage cells may be included in the given one of entries 104 or entries 105 configured to store a portion of status information 205. The storage cells included in entries 104 and entries 105 may be implemented using static random-access (SRAM) memory cells, register file storage cells, or any other suitable storage cell circuits.

Storage circuit 202 may, in various embodiments, be implemented as a first-in first-out (FIFO) queue circuit, configured to send a previously stored request to shared resource 102 based on a duration of how long the previously stored request was stored in storage circuit 202. In other embodiments, storage circuit 202 may select a particular request stored in entries 104 or entries 105 to send to shared resource 102 based on any other suitable information. For example, in some embodiments, storage circuit 202 may select the particular request based on quality-of-service information included in each request stored in entries 104 and entries 105.

Control circuit 203 is configured to generate selection signal 206 and stall signal 207. In various embodiments, control circuit 203 may be further configured to generate selection signal 206 using status information 205. Alternatively, control circuit 203 may generate selection signal 206 using any suitable algorithm, such as a round robin algorithm.

In some embodiments, control circuit 203 may be further configured to generate stall signal 207 using status information 205. In some cases, control circuit 203 may be further configured to activate stall signal 207, in response to a determination that an entry of entries 104 that is assigned to a source that generated selected request 204 is occupied, and an unoccupied entry in entries 105 is not available. It is noted that although a single stall signal is depicted in the embodiment of FIG. 2, in other embodiments, multiple stall signals may be employed. In some cases, a number of stall signals may correspond to a number of sources included in sources 103.

As used herein, when a signal is activated, it is set to a logic or voltage level that activates a load circuit or device. The logic level may be either a high logic level or a low logic level depending on the load circuit. For example, an active state of a signal coupled to a p-channel metal-oxide semiconductor field-effect transistor (MOSFET) is a low logic level (referred to as an "active low signal"), while an active state of a signal coupled to an n-channel MOSFET is a high logic level (referred to as an "active high signal").

Control circuit 203 may, in various embodiments, be implemented as a state machine or other suitable sequential logic circuit. Alternatively, control circuit 203 may be implemented as a microcontroller or general-purpose processor circuit configured to execute software or program instructions. In some embodiments, control circuit 203 may include a register or other suitable storage circuit configured to store status information 205.

Figure 3:
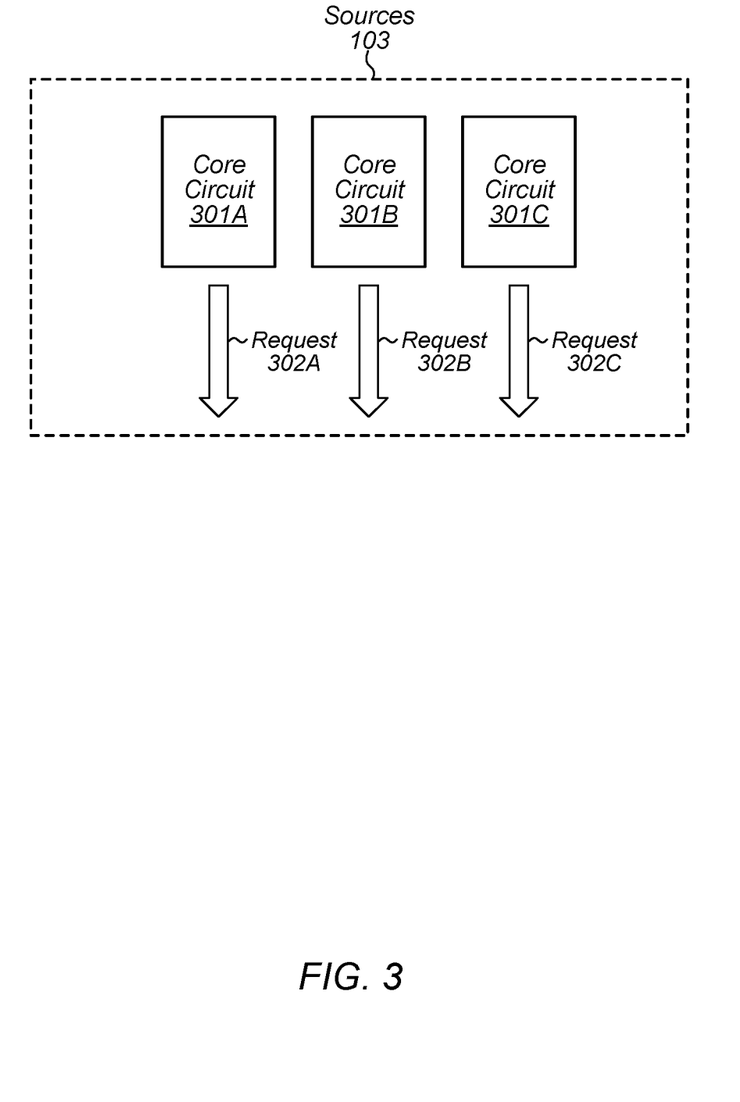
FIG. 3 is a block diagram of an embodiment of sources that can generate access requests to a shared resource.

Requests for access to shared resource 102 may be generated by a variety of software and hardware resources within a computer system. Turning to FIG. 3, a block diagram of an embodiment of sources 103 is depicted. As illustrated, sources 103 includes core circuits 301A-301C. It is noted that although only three core circuits are depicted in the embodiment of FIG. 3, in other embodiments, any suitable number of core circuits may be employed.

Core circuits 301A-301C are configured to generate requests 302A-302C, respectively. Although core circuits 301A-301C are depicted as each generating a single request, in other embodiments, core circuits 301A-301C may each generate multiple requests over a period of time.

In various embodiments, core circuits 301A-301C may correspond to a processor core (or simply a "core") configured to execute application or program software instructions. In other embodiments, core circuits 301A-301C may include one or more local cache memory circuits. In such cases, a given one of requests 302A-302C may be generated in response to a particular one of core circuits 301A-301C determining that a requested instruction or portion of data is unavailable in its local cache memory circuits and needs to be retrieved from a higher-level memory circuit.

Figure 4:
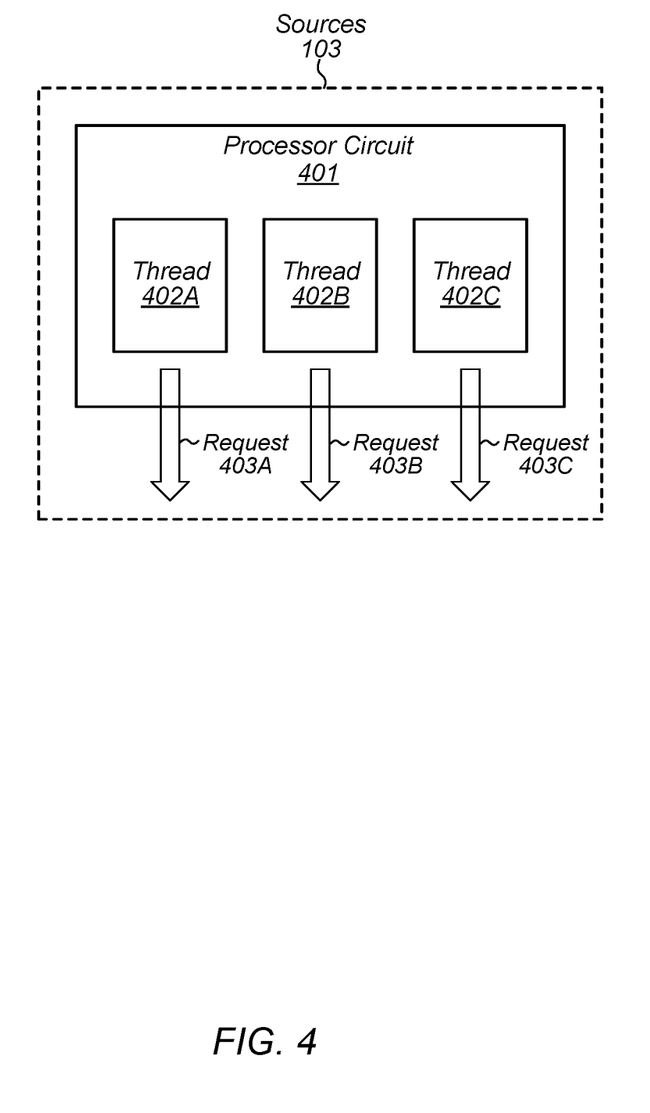
FIG. 4 is a block diagram of another embodiment of sources that can generate access requests to a shared resource.

Sources for requests may not be limited to different circuits. In some cases, a single hardware resource can generate multiple requests. A block diagram of a different embodiment of sources 103 that employs a single processor circuit configured to execute multiple execution threads to generate requests is depicted in FIG. 4. As illustrated, sources 103 includes processor circuit 401. It is noted that although only a single processor circuit is depicted as being included in sources 103, in other embodiments, multiple processor circuits, each executing multiple threads, may be employed.

Processor circuit 401 is configured to execute threads 402A-402C. As used and defined herein, an execution thread (or simply a "thread") is a set of instructions that can be executed by a processor circuit independently from other instructions. For example, an individual software process, such as an application, executing on processor circuit 401, may include threads 402A-402C, which can be scheduled for execution by an operation system or other governing software. A processor circuit, such as processor circuit 401, capable of executing multiple threads may be referred to as being "multi-threaded."

In various embodiments, processor circuit 401 is configured to generate request 403A in response to executing thread 402A. In a similar fashion, processor circuit 401 is configured to generate requests 403B and 403C in response to the execution of threads 402B and 402C, respectively. Requests 403A-403C may, in various embodiments, be included in requests 106 as depicted in FIG. 1. In various embodiments, each requests 403A-403C may be encoded with identifying information so that responses to the requests are made available to the correct thread. It is noted that although processor circuit 401 is depicted as executing three threads, in other embodiments, processor circuit 401 may be configured to execute any suitable number of threads.

Figure 5:
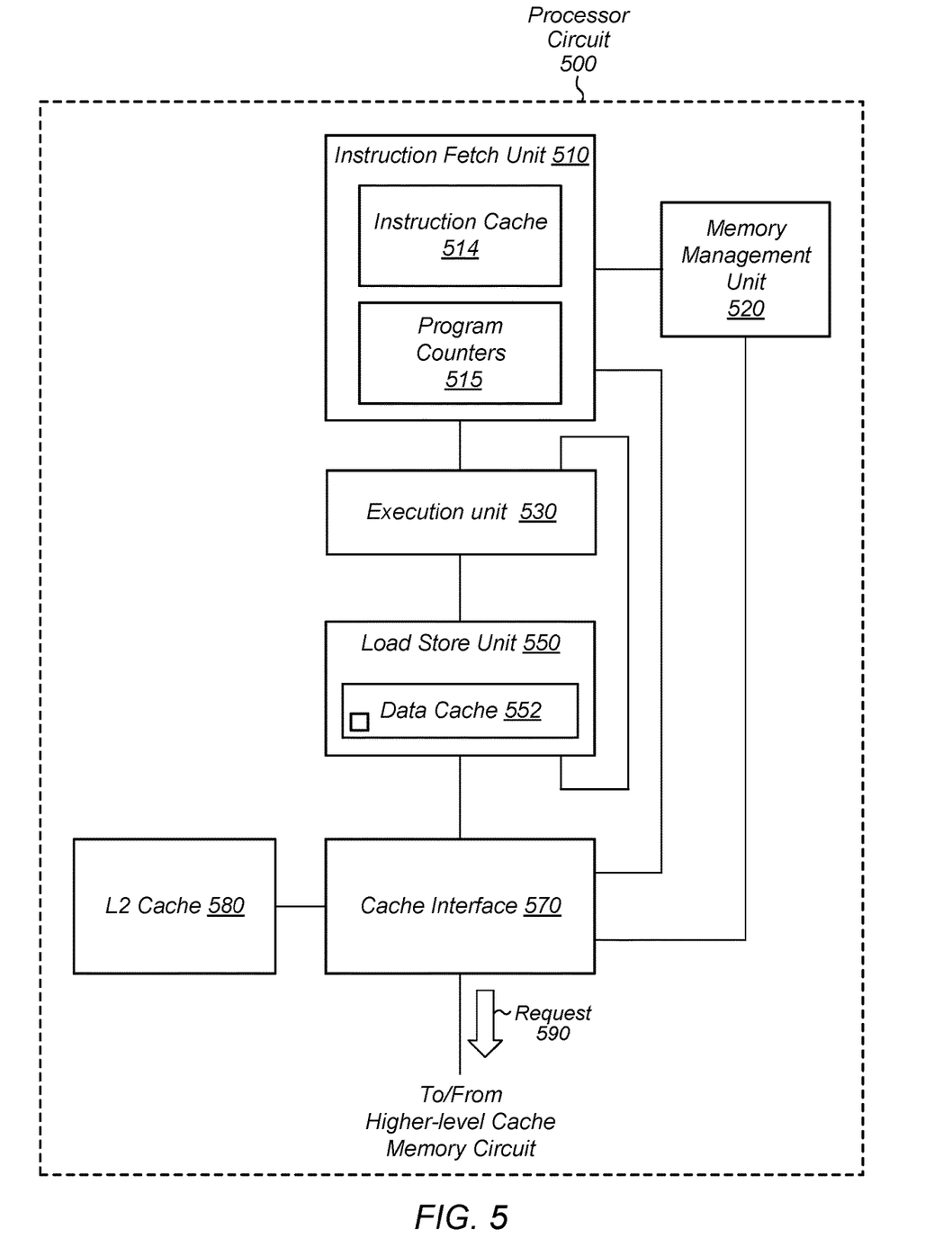
FIG. 5 is a block diagram of an embodiment of a processor circuit.

Turning to FIG. 5, a block diagram of a processor circuit is depicted. As illustrated, processor circuit 500 includes instruction fetch unit 510, memory management unit 520, execution unit 530, load store unit 550, cache interface 570, and L2 cache 580. In various embodiments, processor circuit 500 may correspond to any of core circuits 301A-301C as depicted in FIG. 3.

Instruction fetch unit 510 is coupled to memory management unit 520 and cache interface 570. In various embodiments, instruction fetch unit 510 is configured to perform various operations relating to the fetching of instructions from a cache or memory circuit, the selection of instructions from various threads of execution, and the decoding of such instructions prior to issuing the instructions to various functional units for execution. As illustrated, instruction fetch unit 510 includes instruction cache 514 and program counters 515.

In some embodiments, program counters 515 is configured to generate multiple values corresponding to addresses of instructions to be fetched for respective threads being executed by processor circuit 500. Program counters 515 may be implemented using one or more sequential logic circuits configured to generate such address values.

Memory management unit 520 is configured to relay requests and responses from instruction fetch unit 510 and cache interface 570 to and from system memory. In various embodiments, memory management unit 520 may be further configured to perform address translation from a virtual address space used by processor circuit 500 to a physical address space used by system memory. Memory management unit 520 may, in other embodiments, be configured to translate requests from an internal format used within processor circuit 500 to a format compatible with system memory. In a similar fashion, memory management unit 520 may be further configured to translate replies from system memory into a format compatible with processor circuit 500. In various embodiments, memory management unit 520 may be implemented using a state machine or other sequential logic circuit, a microcontroller, or any other suitable logic circuit.

Execution unit 530 is configured to execute and provide results for certain types of instructions issued from instruction fetch unit 510. In some embodiments, execution unit 630 may be configured to execute certain integer-type instructions defined in the implemented instruction set architecture. It is noted that although only a single execution unit is depicted in the embodiment of FIG. 5, in other embodiments, multiple execution units may be employed.

Load store unit 550 is configured to process data memory references, such as integer and floating-point load and store instructions. In some embodiments, load store unit 550 may be further configured to assist in the processing of instruction cache 514 misses originating from instruction fetch unit 510. As illustrated, load store unit 550 includes data cache 552 in addition to a logic circuit configured to detect cache misses and, in response to such misses, request data from L2 cache 580 or a higher-level cache memory via cache interface 570.

In various embodiments, data cache 552 may be implemented as a write-through cache, in which all writes (or "stores") to data cache 552 are written to a higher-level cache memory regardless of whether the stores hit in data cache 552. In some cases, writes that miss in data cache 552 can result in an allocation within data cache 552 that can be used for storing the data.

L2 cache 580 is configured to store (or "cache") frequently used instructions and data for use by execution unit 530. In various embodiments, L2 cache 580 may be implemented using multiple banks that can be independently accessed using corresponding addresses. Such banks may be implemented using set-associative or direct-mapped techniques.

Cache interface 570 is configured to relay requests (e.g., request 590) from data cache 552 and L2 cache 580 to higher-level cache memory circuits. In response to a determination that requested data is unavailable from the higher-level cache memory circuits, cache interface 570 may relay the data request to memory management unit 520 for transmission to system memory or other storage. Cache interface 570 may, in various embodiments, be implemented using a state machine or other sequential logic circuit, a microcontroller, or any other suitable logic circuit.

Figure 6:
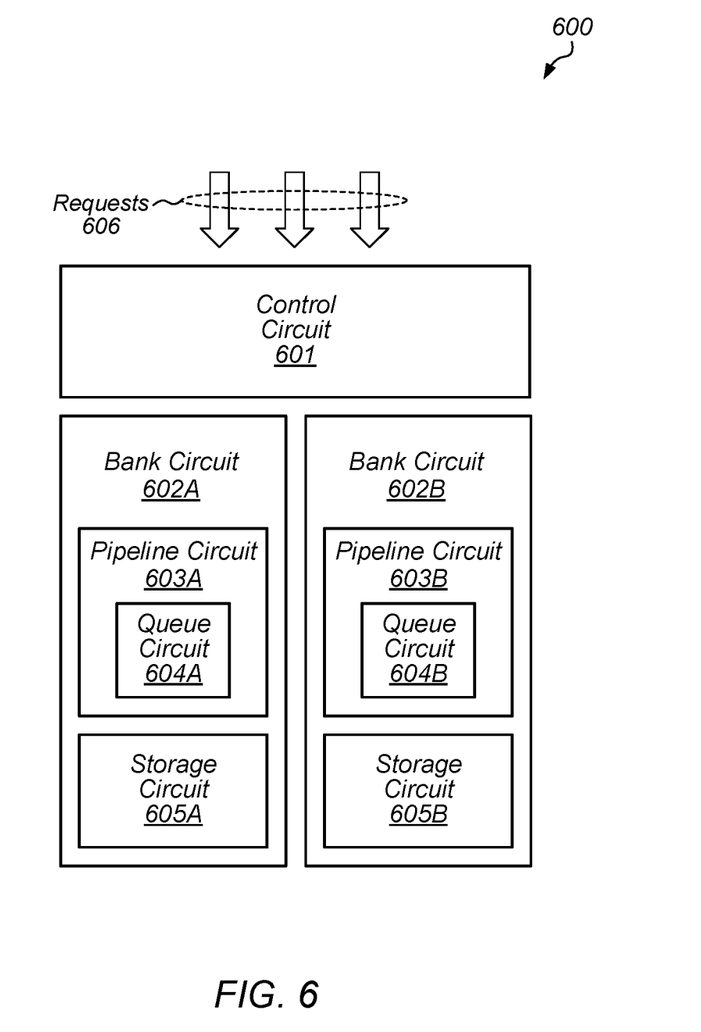
FIG. 6 is a block diagram of an embodiment of a cache memory circuit.

Queue circuit 101 may be located within a variety of locations within a computer system depending on the architecture of the computer system. In some cases, queue circuit 101 may be located within a shared resource to manage requests received by the shared resource. A block diagram of a multi-bank cache memory circuit that includes queue circuits is depicted in FIG. 6. As illustrated, cache memory circuit 600 includes control circuit 601, bank circuit 602A, and bank circuit 602B. It is noted that although only two bank circuits are depicted in cache memory circuit 600, in other embodiments, cache memory circuit 600 may include any suitable number of bank circuits.

Control circuit 601 is configured to receive requests 606 from multiple sources. In various embodiments, requests 606 may correspond to requests 106 generated by sources 103 as depicted FIG. 1. Control circuit 601 may be configured to route different ones of requests 606 to either bank 602A or bank 602B based on address information included in requests 606 or any other suitable information.

Bank circuit 602A includes pipeline circuit 603A and storage circuit 605A. In a similar fashion, bank circuit 602B includes pipeline circuit 603B and storage circuit 605B. Pipeline circuit 603A includes queue circuit 604A, and pipeline circuit 603B includes queue circuit 604B. In various embodiments, queue circuits 604A and 604B may correspond to queue circuit 101 as depicted in FIGS. 1 and 2.

Pipeline circuit 603A is configured to process requests routed to bank circuit 602A by control circuit 601. In a similar fashion, pipeline circuit 603B is configured to process requests routed to bank circuit 602B by control circuit 601. In various embodiments, pipeline circuits 603A and 603B may include respective stages of logic circuits configured to perform respective operations. The stages are connected in series, where the output of one stage is the input of the next stage. In some embodiments, the stages of pipeline circuits 603A and 603B can be configured to operate in parallel or in time-sliced fashion. In some embodiments, buffer circuits may be inserted between the different stages within pipeline circuits 603A and 603B.

Queue circuit 604A is included in one stage of pipeline circuit 603A, and queue circuit 604B is included in one stage of pipeline circuit 603B. In various embodiments, queue circuit 604A is configured to manage access to storage circuit 605A, and queue circuit 604B is configured to manage access to storage circuit 605B as described above in regards to the embodiments of FIGS. 1 and 2. By employing queue circuits 604A and 604B, pipeline circuits 603A and 603B can prevent requests from a single source from consuming all of the access to storage circuits 605A and 605B, ensuring that forward progress is guaranteed for requests from all of the sources generating requests to cache memory circuit 600.

Storage circuits 605A and 605B may, in various embodiments, be implemented using multiple SRAM storage cell circuits. Alternatively, storage circuits 605A and 605B may each include multiple ports, for example, each of storage circuits 605A and 605B may include a read port and a write port. In such cases, storage circuits 605A and 605B may be implemented using multiple multi-port storage cell circuits.

To summarize, various embodiments, of a queue circuit configured to manage access to a shared resource in a computer system disclosed. Broadly speaking, an apparatus is contemplated that includes a plurality of sources, including at least one processor core, configured to generate a plurality of requests to access a memory circuit, and a queue circuit includes a first plurality of entries and a second plurality of entries. The queue circuit is configured to store a given request of the plurality of requests in a particular entry in the second plurality of entries in the storage circuit in response to a determination that an assigned entry of the first plurality of entries assigned to a particular source of the plurality of sources that generated the given request is occupied.

In some embodiments, queue circuit is further configured to store a different request of the plurality of requests in a different entry of the first plurality of entries assigned to a different source of the plurality of sources that generated the different request, in response to a determination that the different entry is unoccupied. In other embodiments, the queue circuit is further configured to send a stall signal to a different source of the plurality of sources in response to a determination that a different entry of the first plurality of entries assigned to the different source is occupied, and an unoccupied entry of the second plurality of entries is not available.

In various embodiments, to send the previously stored request to the memory circuit, the queue circuit is further configured to deallocate a corresponding entry in the first plurality of entries or the second plurality of entries where the previously stored request was located. In some embodiments, the memory circuit includes a cache memory circuit.

Figure 7:
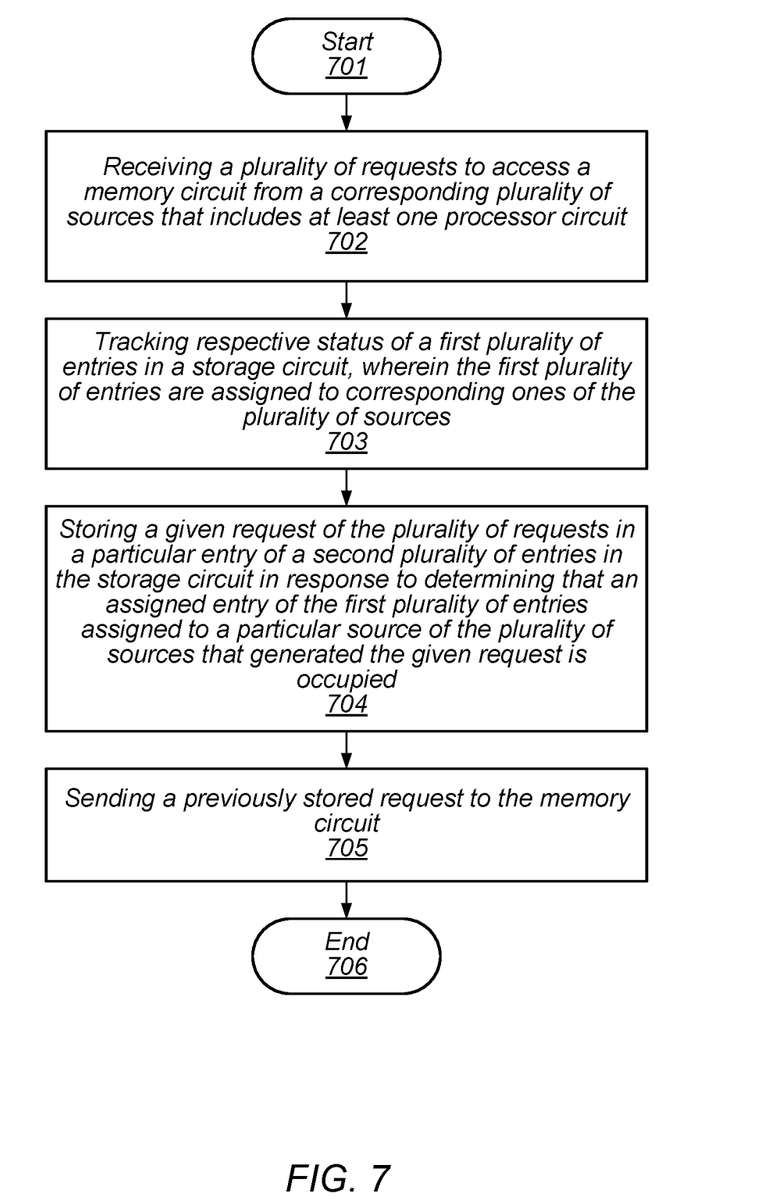
FIG. 7 is a flow diagram of an embodiment of a method for managing access to a shared resource in a computer system.

Turning to FIG. 7, a flow diagram depicting an embodiment of a method for managing access to a shared resource in a computer system is illustrated. The method, which may be applied to various queue circuits (e.g., queue circuit 101), begins in block 701.

The method includes receiving, from a plurality of sources that includes at least one processor circuit, a plurality of requests to access a memory circuit (block 702). In some embodiments, the memory circuit may include a cache memory circuit that includes multiple banks. Alternatively, the memory circuit may, in other embodiments, include a hard-disc drive or other form of non-volatile memory circuit. In various embodiments, the plurality of requests may be requests for data stored in the memory circuit, although other types of requests are possible and contemplated.

In some cases, the method may further include generating the plurality of requests by a corresponding plurality of processor circuits. In other cases, the method may further include generating the plurality of request by the at least one processor circuit executing a corresponding a plurality of threads.

The method further includes tracking the respective status of a first plurality of entries in a storage circuit, where the first plurality of entries are assigned to corresponding ones of the plurality of sources (block 703).

The method also includes storing a given request of the plurality of requests in a particular entry of a second plurality of entries in the storage circuit in response to determining that an assigned entry of the first plurality of entries assigned to a particular source of the plurality of sources that generated the given request is occupied (block 704). The method also include storing a different request of the plurality of requests in a different entry of the first plurality of entries assigned to a different source of the plurality of sources that generated the different request in response to determining that different entry is unoccupied.

In some cases, both the first and second plurality of entries in the storage circuit may be occupied. In such circumstances, the method may include sending a stall signal to a different source of the plurality of sources in response to determining that a different entry of the first plurality of entries assigned to the different source is occupied and an unoccupied entry of the second plurality of entries is not available. The method may further include halting, by the different source, sending further requests until the stall signal is deactivated.

The method also includes sending a previously stored request to the memory circuit (block 705). In various embodiments, sending the previously stored request may include deallocating a corresponding entry in either of the first plurality of entries or the second plurality of entries where the previously stored request was located. The method concludes in block 706.

Figure 8:
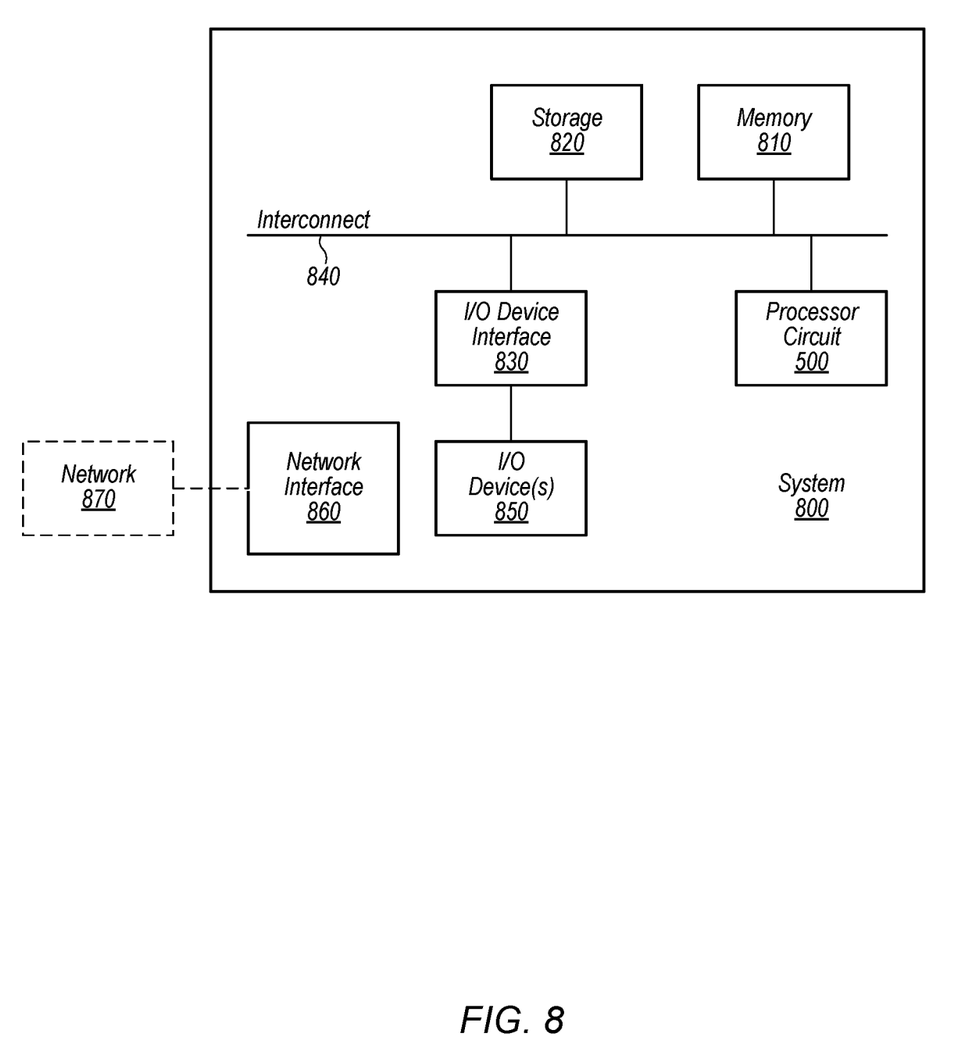
FIG. 8 is a block diagram of one embodiment of a computing device.

Processor circuit 500, described above with reference to FIG. 5, may be included within a variety of system configurations, one example of which is shown in FIG. 8. In various embodiments, system 800 may correspond to a general-purpose computer system such as a desktop or portable computer, a mobile phone, or the like. System 800 may also correspond to any type of embedded system that may employ one or more instances of processor circuit 500 as a dedicated controller. For example, system 800 may correspond to any type of computer peripheral device such as a mass storage device or storage array, printer, or the like, as well as control systems for automobiles, aviation, manufacturing, and other suitable applications.

As shown, system 800 includes processor circuit 500, memory 810, storage 820, and an input/output (I/O) device interface 830 coupled via an interconnect 840. One or more I/O devices 850 are coupled via I/O device interface 830. System 800 also includes network interface 860 that may be configured to couple system 800 to network 870 for communications with, e.g., other systems. In various embodiments, network interface 860 may be coupled to interconnect 840 directly, via I/O device interface 830, or according to a different configuration. It is noted that some or all of the components of system 800 may be fabricated as a system-on-a-chip, although discrete combinations of components may also be employed.

Processor circuit 500 may include a cache memory circuit as disclosed above. Memory 810 may include random-access memory (RAM) of any suitable organization configured to store data and instructions usable by processor circuit 500. Storage 820 may include mass storage devices such as magnetic, optical, or nonvolatile/flash memory storage, or any combination of these. In some embodiments, either memory 810 or storage 820 may be omitted or integrated into the other as a single memory subsystem from the perspective of processor circuit 500.

I/O device interface 830 may be configured to interface between interconnect 840 and one or more other types of buses or interfaces. For example, interconnect 840 may correspond to the advanced high-bandwidth bus ("AHB") interface or another suitable type of high-bandwidth interconnect, and I/O device interface 830 may be configured as a bridge device that enables coupling of different types of I/O devices to interconnect 840. I/O device interface 830 may implement one or more interface protocols such as Universal Serial Bus, Firewire, or other suitable standards. I/O device(s) 850 may include any suitable type of storage, network interface, user interface, graphics processing, or other type of device. Network 870, if present, may be any suitable type of wired or wireless communications network, such as an Internet Protocol (IP) addressed local or wide-area network, a telecommunications network, or the like. Network interface 860, if present, may be configured to implement any suitable network interface protocol needed for communication with network 870.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims.

Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit, and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements are defined by the functions or operations that they are configured to implement. The arrangement of such circuits/units/components, with respect to each other and the manner in which they interact, form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements that may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in a scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
   a plurality of sources, including at least one processor core, configured to generate a plurality of requests to access a memory circuit; and
   a queue circuit including a first plurality of entries and a second plurality of entries, wherein each entry of the first plurality of entries is assigned to a particular source from the plurality of sources based on which source is used to generate a given request from the plurality of requests, such that each entry of the first plurality of entries is dedicated to at least one source from the plurality of sources, wherein the queue circuit is configured to:
   store the given request of the plurality of requests in a particular entry of the second plurality of entries in a storage circuit in response to a determination that an assigned entry of the first plurality of entries assigned to the particular source of the plurality of sources that generated the given request is occupied, wherein the queue circuit is configured to store the given request in a particular entry of a plurality of floating entries, wherein the plurality of floating entries is configured to be dynamically distributed to different sources to accommodate periods where a number of access requests is greater than a typical number of access requests; and
   send a previously stored request to the memory circuit.

2. The apparatus of claim 1, wherein the queue circuit is further configured to store a different request of the plurality of requests in a different entry of the first plurality of entries assigned to a different source of the plurality of sources that generated the different request, in response to a determination that the different entry is unoccupied.

3. The apparatus of claim 1, wherein the queue circuit is further configured to send a stall signal to a different source of the plurality of sources in response to a determination that a different entry of the first plurality of entries assigned to the different source is occupied, and an unoccupied entry of the second plurality of entries is not available.

4. The apparatus of claim 1, wherein to send the previously stored request to the memory circuit, the queue circuit is further configured to deallocate a corresponding entry in the first plurality of entries or the second plurality of entries where the previously stored request was located.

5. The apparatus of claim 1, wherein the memory circuit includes a cache memory circuit that includes multiple banks.

6. The apparatus of claim 1, wherein the plurality of sources includes a plurality of processor circuits configured to generate corresponding ones of the plurality of requests.

7. A method, comprising:
receiving, from a plurality of sources that includes at least one processor circuit, a plurality of requests to access a memory circuit;
tracking respective status of a first plurality of entries in a storage circuit, wherein each entry of the first plurality of entries is assigned to a particular source from the plurality of sources based on which source is used to generate a given request from the plurality of requests, such that each entry of the first plurality of entries is dedicated to at least one source from the plurality of sources;
storing the given request of the plurality of requests in a particular entry of a second plurality of entries in the storage circuit in response to determining that an assigned entry of the first plurality of entries assigned to the particular source of the plurality of sources that generated the given request is occupied, wherein the queue circuit is configured to store the given request in a particular entry of a plurality of floating entries, wherein the plurality of floating entries is configured to be dynamically distributed to different sources to accommodate periods where a number of access requests is greater than a typical number of access requests; and
sending a previously stored request to the memory circuit.

8. The method of claim 7, further comprising storing a different request of the plurality of requests in a different entry of the first plurality of entries assigned to a different source of the plurality of sources that generated the different request in response to determining that the different entry is unoccupied.

9. The method of claim 7, further comprising sending a stall signal to a different source of the plurality of sources in response to determining that a different entry of the first plurality of entries assigned to the different source is occupied and an unoccupied entry of the second plurality of entries is not available.

10. The method of claim 7, wherein sending the previously stored request to the memory circuit includes deallocating a corresponding entry in the first plurality of entries or the second plurality of entries where the previously stored request was located.

11. The method of claim 7, wherein the memory circuit includes a cache memory circuit that includes multiple banks.

12. The method of claim 7, further comprising, generating the plurality of requests by a corresponding plurality of processor circuits.

13. The method of claim 7, further comprising, generating the plurality of requests by the at least one processor circuit executing a corresponding a plurality of threads.

14. An apparatus, comprising:
a plurality of bank circuits including respective pipeline circuits; and
a control circuit configured to:
receive, from a plurality of sources that includes at least one processor circuit, a plurality of access requests; and
route a given request of the plurality of requests to a particular bank circuit of the plurality of bank circuits, wherein the particular bank circuit includes a storage circuit and a pipeline circuit that includes a queue circuit including a first plurality of entries and a second plurality of entries configured to store the given request in a particular entry of a plurality of floating entries, in response to a determination that an assigned entry of a plurality of assigned entries assigned to a particular source of the plurality of sources that generated the given request is occupied, wherein the plurality of floating entries are dynamically distributed to different sources to accommodate periods where a number of access requests is greater than a typical number of access requests, wherein each entry of the first plurality of entries is assigned to a particular source from the plurality of sources based on which source is used to generate the given request from the plurality of requests, such that each entry of the first plurality of entries is dedicated to at least one source from the plurality of sources.

15. The apparatus of claim 14, wherein the control circuit is further configured to route a different request of the plurality of requests to the particular bank circuit, and wherein the queue circuit is further configured to store the different request of the plurality of requests in a different entry of the plurality of assigned entries assigned to a different source of the plurality of sources that generated the different request in response to a determination that the different entry is unoccupied.

16. The apparatus of claim 14, wherein the queue circuit is further configured to send a stall signal to a different source of the plurality of sources in response to a determination that a different entry of the plurality of assigned entries assigned to the different source is occupied and an unoccupied entry of plurality of the floating entries is not available.

17. The apparatus of claim 14, wherein the queue circuit is further configured to send a particular request previously stored in an occupied entry in either the plurality of assigned entries or the plurality of floating entries to the storage circuit.

18. The apparatus of claim 17, wherein the queue circuit is further configured to deallocate the occupied entry in response to sending the particular request to the storage circuit.

19. The apparatus of claim 14, wherein the plurality of sources includes a plurality of processor circuits configured to generate the plurality of requests.

20. The apparatus of claim 14, wherein the at least one processor circuit is configured to execute a plurality of threads to generate the plurality of requests.

* * * * *